United States Patent  
Yokoyama et al.

(10) Patent No.: US 9,247,252 B2  
(45) Date of Patent: Jan. 26, 2016

(54) IMAGE DECODING DEVICE

(75) Inventors: Toru Yokoyama, Sagamihara (JP); Tomokazu Murakami, Kokubunji (JP); Katsuyuki Nakamura, Saitama (JP)

(73) Assignee: HITACHI, LTD., Tokyo (JP)

(*) Notice: Subject to any disclaimer, the term of this patent is extended or adjusted under 35 U.S.C. 154(b) by 411 days.

(21) Appl. No.: 13/990,592

(22) PCT Filed: Jan. 26, 2011

(86) PCT No.: PCT/JP2011/051495  
§ 371 (c)(1),  
(2), (4) Date: May 30, 2013

(87) PCT Pub. No.: WO2012/101781  
PCT Pub. Date: Aug. 2, 2012

(65) Prior Publication Data  
US 2013/0251038 A1    Sep. 26, 2013

(51) Int. Cl.  
*H04N 7/50* (2006.01)  
*H04N 19/593* (2014.01)  
*H04N 19/176* (2014.01)  
*H04N 19/70* (2014.01)  
*H04N 19/119* (2014.01)  
*H04N 19/61* (2014.01)  
*H04N 19/96* (2014.01)  
*H04N 19/103* (2014.01)  
*H04N 19/463* (2014.01)

(52) U.S. Cl.  
CPC ....... *H04N 19/00763* (2013.01); *H04N 19/103* (2014.11); *H04N 19/119* (2014.11); *H04N 19/176* (2014.11); *H04N 19/463* (2014.11); *H04N 19/61* (2014.11); *H04N 19/70* (2014.11); *H04N 19/96* (2014.11)

(58) Field of Classification Search  
None  
See application file for complete search history.

(56) References Cited

U.S. PATENT DOCUMENTS

2006/0251330 A1  11/2006  Toth et al.  
2008/0095241 A1  4/2008  Amon et al.  
(Continued)

FOREIGN PATENT DOCUMENTS

JP  2007-503784  2/2007  
JP  2007-116351  5/2007  
JP  2008-511226  4/2008  
(Continued)

OTHER PUBLICATIONS

JP Office Action for Japanese Application No. 2012-554570, issued on Apr. 1, 2014.

(Continued)

*Primary Examiner* — Dave Czekaj  
*Assistant Examiner* — Nam Pham  
(74) *Attorney, Agent, or Firm* — Baker Botts L.L.P.

(57) ABSTRACT

In expansion and reduction of the size of a macroblock in a moving image encoding, a compression ratio falls because an information amount for describing size information of the macroblock increases. An image decoding device includes a CU dividing unit and a CU-size storing unit. The CU-size storing unit has stored therein size information of an encoded CU in an encoding target picture to be stored and size information of all CUs in preceding and following pictures used for prediction. The CU dividing unit predicts a CU size in an encoding target position using the CU size information stored in the CU-size storing unit and determines a CU size of a final encoding target CU.

17 Claims, 21 Drawing Sheets

(56) References Cited

U.S. PATENT DOCUMENTS

2009/0046781 A1* 2/2009 Moriya .................. H04N 7/50
                                                           375/240.12
2010/0061456 A1    3/2010 Park

FOREIGN PATENT DOCUMENTS

| JP | 2009-522977 | 6/2009 |
|----|----|----|
| WO | WO 2009/041215 A1 | 4/2009 |
| WO | WO 2011/146696 A1 | 12/2010 |
| WO | WO 2011/002091 | 1/2011 |
| WO | WO 2011/002091 A1 | 1/2011 |

OTHER PUBLICATIONS

Ken McCann, Samsung's response to the Call for Proposals on Video Compression Technology, Joint Collaborative Team on Video Coding (JCT-VC) of ITU-T SG16 WP3 and ISO/IEC JTC1/SC29/WG11, 1st Meeting: Dresden, DE, Apr. 15-23, 2010. Document JCTVC-A124. Ken@zetacast.com.

* cited by examiner

FIG. 7

```
coding_unit( x0, y0, currCUSize, pred) { if( x0+currCUSize < PicWidth &&
      y0+currCUSize < PicHeight &&
      currCUSize > MinCUSize ) {
    if( currCUSize == LCUSize )
      use_pred_split_flag (1)              ———— L700
    else
      use_pred_split_flag = pred            ———— L701
    if( use_pred_split_flag == 1 )
      split_flag = pred_split_flag
    else
      split_flag (1)                        ———— L702
    if( split_flag ) {
      splitCUSize = currCUSize >> 1  ┐
      x1 = x0 + splitCUSize          ├— L703
      y1 = y0 + splitCUSize          ┘
      coding_unit( x0, y0, splitCUSize, use_pred_split_flag )  ←—— CU0    L704
      if( x1 < PicWidth )                                                  L705
        coding_unit( x1, y0, splitCUSize, use_pred_split_flag )  ←—— CU1
      if( y1 < PicHeight )                                                 L706
        coding_unit( x0, y1, splitCUSize, use_pred_split_flag )  ←—— CU2
      if( x1 < PicWidth && y1 < PicHeight )                                L707
        coding_unit( x1, y1, splitCUSize, use_pred_split_flag )  ←—— CU3
    } else {
      prediction_unit( x0, y0, currCUSize )  ———— L708
      transform_unit( x0, y0, currCUSize )   ———— L709
    }
  }
}
```

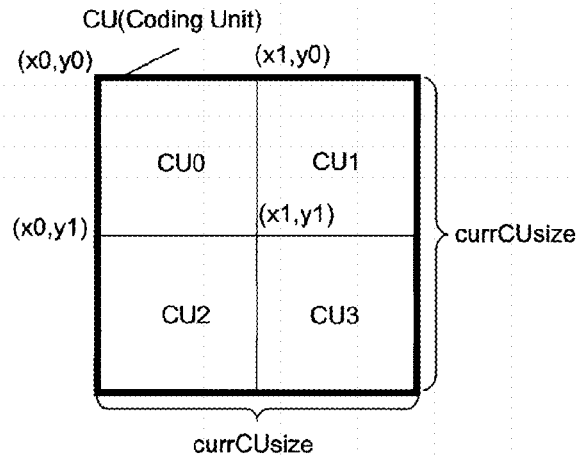

FIG. 21

```
coding_unit( x0, y0, currCUSize, pred) { if( x0+currCUSize < PicWidth &&
      y0+currCUSize < PicHeight &&
      currCUSize > MinCUSize ) {
    if( currCUSize == LCUSize ){
       use_pred_split_flag (1)
       use_intra_split_pred_flag(1)
    }else
       use_pred_split_flag = pred
    if( use_pred_split_flag == 1 )
       split_flag = pred_split_flag
    else
       split_flag (1)
    if( split_flag ) {
      splitCUSize = currCUSize >> 1
      x1 = x0 + splitCUSize
      y1 = y0 + splitCUSize
      coding_unit( x0, y0, splitCUSize, use_pred_split_flag )
      if( x1 < PicWidth )
        coding_unit( x1, y0, splitCUSize, use_pred_split_flag )
      if( y1 < PicHeight )
        coding_unit( x0, y1, splitCUSize, use_pred_split_flag )
      if( x1 < PicWidth  &&  y1 < PicHeight )
        coding_unit( x1, y1, splitCUSize, use_pred_split_flag )
    } else {
      prediction_unit( x0, y0, currCUSize )
      transform_unit( x0, y0, currCUSize )
    }
  }
}
```

IMAGE DECODING DEVICE

TECHNICAL FIELD

The present invention relates to encoding of an image signal and decoding of encoded data of the image signal.

BACKGROUND ART

In a moving image encoding system represented by ITU-T H.264, an entire screen is divided into an encoding unit called a macroblock of 16 pixels×16 pixels to perform encoding.

In H.264, for an encoding target macroblock, a predicted value of a pixel value in the encoding target macroblock is determined using peripheral pixels and preceding and following pictures and a predicted error between encoding target pixels and the predicted value is entropy-encoded.

When the pixel value in the macroblock is predicted, intra-prediction for predicting the pixel value from the peripheral pixels and inter-prediction for predicting the pixel value from pixels of preceding and following pictures can be selected for each of macroblocks according to patterns in the macroblocks. The macroblock can be divided into prediction blocks smaller than 16 pixels×16 pixels to perform prediction. For example, as shown in FIG. 2, in the intra-prediction of H.264, the macroblock of 16 pixels×16 pixels is divided into sixteen prediction blocks of 4 pixels×4 pixels and peripheral pixels are copied to each of the prediction blocks in nine kinds of directions indicated by indexes 0 to 8 shown in FIG. 2, whereby pixels in the prediction blocks can be predicted.

As shown in FIG. 3, the macroblock is not divided and, in a prediction block of 16 pixels×16 pixels, peripheral pixels are copied in four kinds of directions indicated by indexes 0 to 3 shown in FIG. 3, whereby pixels in the prediction block can be predicted.

Concerning the inter-prediction of H.264, similarly, in the macroblock, the macroblock can be divided into smaller prediction blocks and motion vectors can be set for each of the prediction blocks. For example, as shown in FIG. 4, when a motion from a picture in the past is predicted, the macroblock can be divided into prediction blocks of 16 pixels×16 pixels, 16 pixels×8 pixels, 8 pixels×16 pixels, and 8 pixels×8 pixels (in this case, each of the prediction blocks can be further divided into 8 pixels×4 pixels, 4 pixels×8 pixels, and 4 pixels×4 pixels) and motion vectors different from one another can be set for the prediction blocks.

As explained above, the inside of the macroblock is divided into the prediction blocks and prediction is performed for each of the prediction blocks. Consequently, prediction accuracy is improved, for example, when a boundary of different patterns is present in the macroblock, leading to improvement of a compression ratio.

However, in the related art represented by H.264, the size of the macroblock is limited to a size equal to or smaller than 16 pixels×16 pixels. Prediction cannot be performed in a unit of a size larger than 16 pixels×16 pixels.

The selection of the intra-prediction or the inter-prediction can be set only in a macroblock unit. Therefore, the intra-prediction and the inter-prediction cannot be selected in a unit smaller than 16 pixels×16 pixels.

Therefore, in recent years, a technique for giving flexibility to the size itself of the macroblock and setting prediction blocks in a unit of a size larger than or smaller than 16 pixels×16 pixels has been disclosed (PTL 1 and NPL 1).

CITATION LIST

Patent Literature

PTL 1: JP-T-2007-503784

Non-Patent Literature

NPL 1: Joint Collaborative Team on Video Coding (JCT-VC) of ITU-T SG16 WP3 and ISO/IEC JTC1/SC29/WG11, JCTVC-A124 April, 2010.

SUMMARY OF INVENTION

Technical Problem

However, expansion and reduction of the size of a macroblock in the moving image encoding described in PTL 1 and NPL 1 has a problem in that a compression ratio falls because an information amount for describing size information of the macroblock increases.

An object of the present invention is to reduce, in image encoding/decoding processing involving expansion and reduction of a macroblock, an information amount for describing size information of the macroblock.

Solution to Problem

This application includes a plurality of means for solving the problem. A representative example of the means is as explained below.

An image decoding device according to the present invention includes a CU dividing unit and a CU-size storing unit. The CU-size storing unit has stored therein size information of an encoded CU in an encoding target picture to be stored and size information of all CUs in preceding and following pictures used for prediction. The CU dividing unit predicts a CU size in an encoding target position using the CU size information stored in the CU-size storing unit and determines a CU size of a final encoding target CU.

Advantageous Effect of Invention

According to the present invention, in the image encoding/decoding processing involving expansion or reduction of a CU, it is possible to improve a compression ratio by reducing an information amount for describing the size of the CU.

BRIEF DESCRIPTION OF THE DRAWINGS

FIG. 7 is a diagram for explaining an example of syntax in an encoded stream by CU division prediction.

FIG. 21 is a diagram for explaining an example of syntax in an encoded stream according to a second embodiment.

DESCRIPTION OF EMBODIMENTS

The present invention relates to an image encoding device and an image decoding device used in an image encoding and decoding technique for encoding an original image and decoding the encoded image.

The image encoding device includes a CU dividing unit and a CU-size storing unit. A CU (Coding Unit) is an encoding unit block and is equivalent to the concept of the macroblock in the related art. The CU-size storing unit has stored therein size information of an encoded CU in an encoding target picture to be stored and size information of all CUs in preceding and following pictures used for prediction. The CU dividing unit predicts a CU size in an encoding target position using the CU size information stored in the CU-size storing unit and determines a CU size of a final encoding target CU.

In an encoded stream output by the image encoding device, for each of the encoding target CUs, flag information indicating whether the encoding target CU coincides with the predicted CU size is stored. When the flag information is 1 (coinciding with the predicted size), the CU size information is not included in the encoded stream. On the other hand, when the flag information is 0 (not coinciding with the predicted size), the CU size information is included in the encoded stream. In other words, flags indicating a predicting mode (1) and a mode for extracting the CU size information from the encoded stream (0) are included in the encoded stream.

The image decoding device includes a CU dividing unit and a CU-size storing unit. The CU-size storing unit has stored therein size information of a decoded CU in an encoding target picture to be stored and size information of all CUs in preceding and following pictures used for prediction. When the flag information included in the encoded stream is 1 (coinciding with the predicted size), the CU dividing unit predicts, without attempting to extract CU size information from an encoded bit stream, a CU size in a decoding target position using the CU size information stored in the CU-size storing unit and determines a CU size of a final decoding target CU. When the flag information included in the encoded stream is 0 (not coinciding with the predicted size), the CU dividing unit determines the CU size of the decoding target CU using the CU size information included in the encoded stream.

Detailed configurations of the image encoding device and the image decoding device are explained in embodiments below. The present invention is not limited to only the embodiments.

First Embodiment

<Configuration of an Image Encoding Device>

Figure 1:
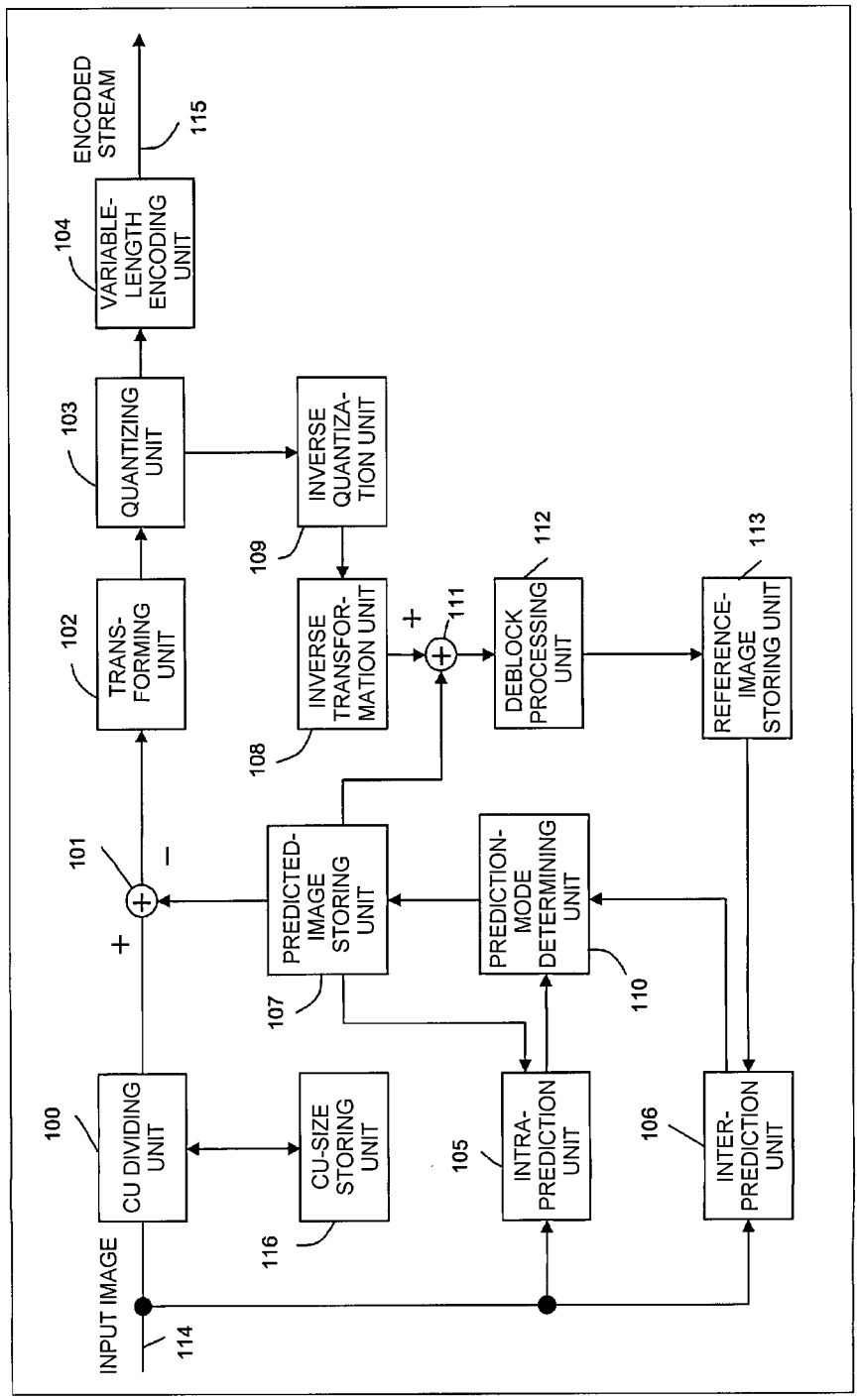
FIG. 1 is a diagram showing a schematic configuration of an image encoding device according to a first embodiment.
Figure 2:
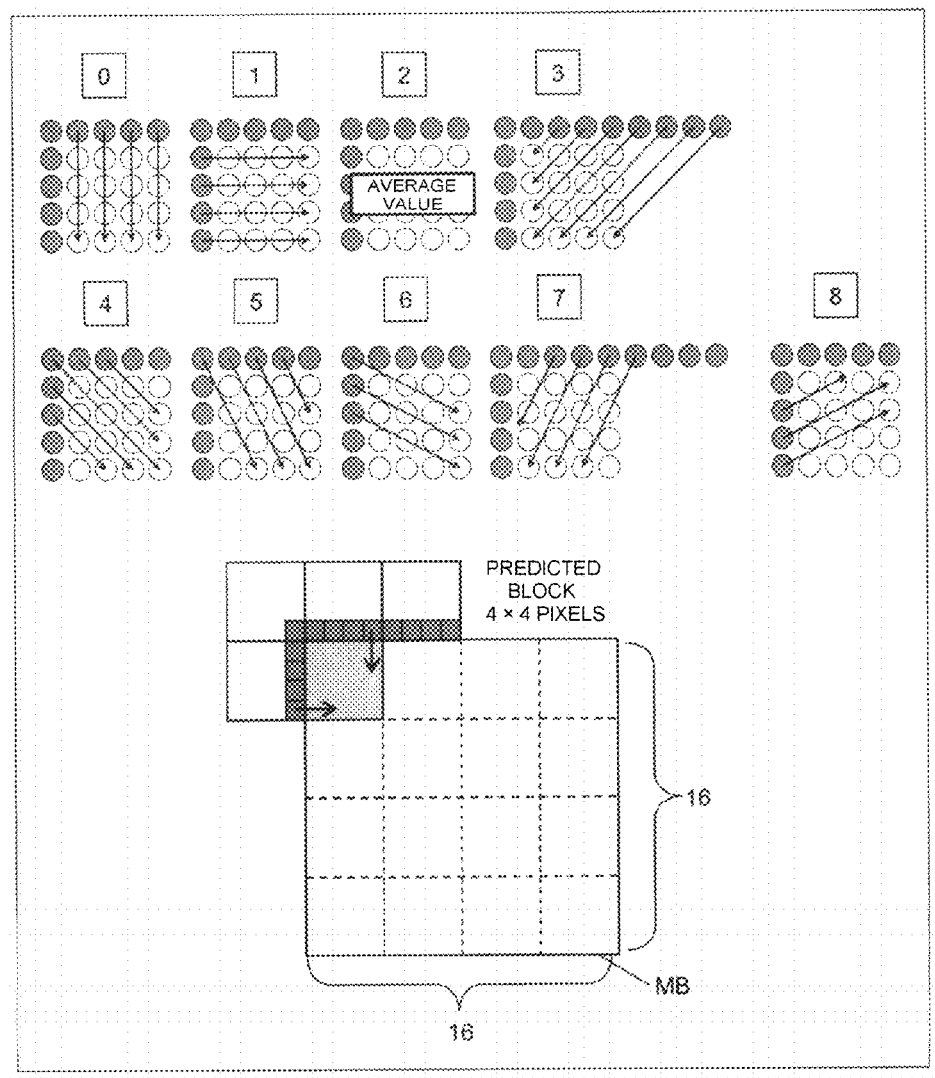
FIG. 2 is a diagram for explaining an example of intra-prediction processing of the related art.
Figure 3:
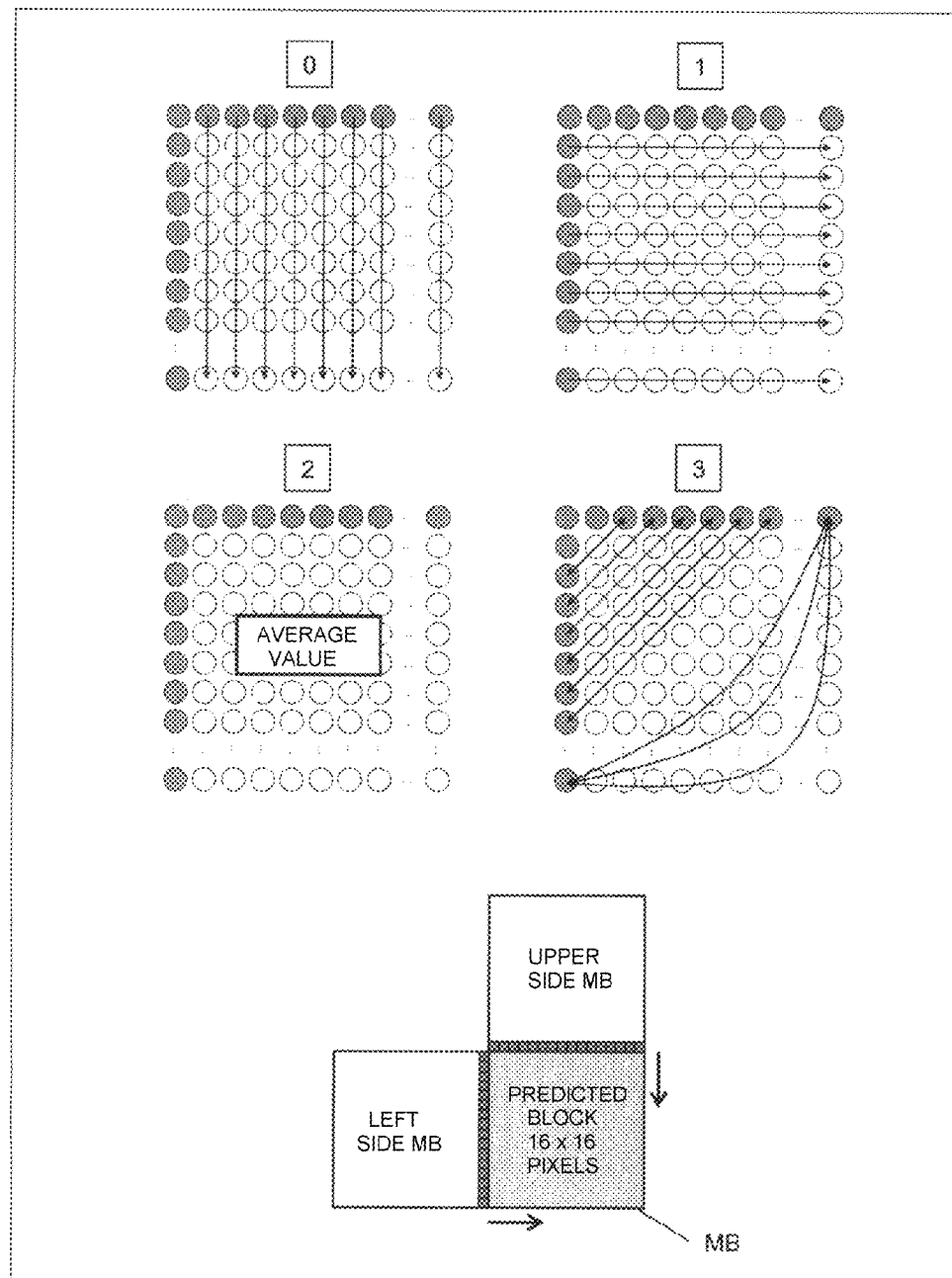
FIG. 3 is a diagram for explaining an example of the intra-prediction processing of the related art.
Figure 4:
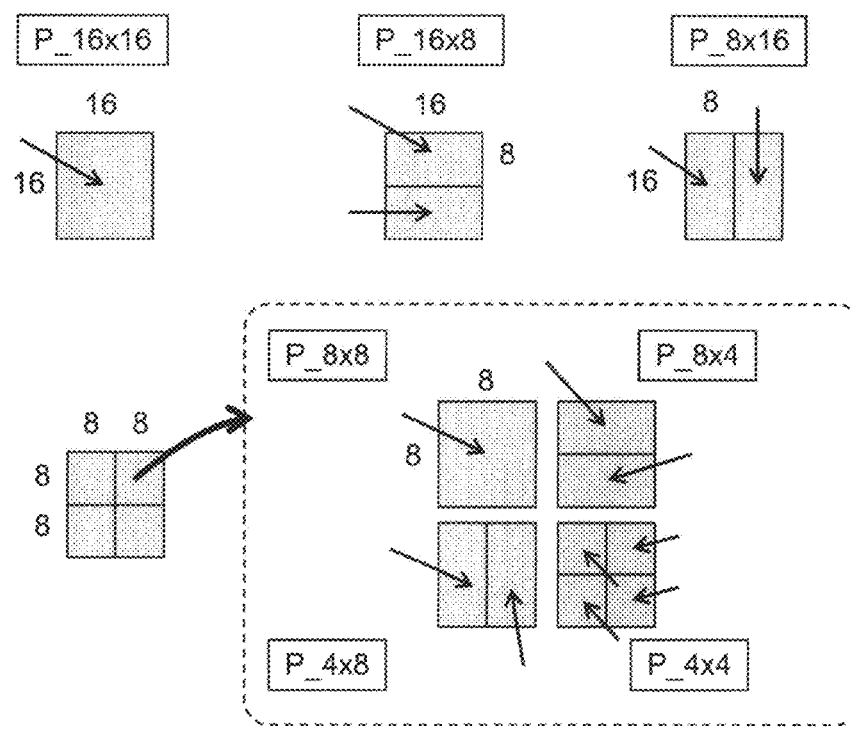
FIG. 4 is a diagram for explaining an example of inter-prediction processing of the related art.

FIG. 1 is a diagram showing a schematic configuration of an image encoding device according to a first embodiment. As shown in FIG. 1, the image encoding device includes a CU-size storing unit 116 having stored therein size information of an encoded CU, a CU dividing unit 100 configured to predict, on the basis of the encoded CU size information stored in the CU-size storing unit 116, the size of a CU that should be set as an encoding target CU in an input image 114 and determine the CU size, a predicted-image storing unit 107 in which a predicted image is stored, a differentiator 101 configured to generate a predicted difference image between the predicted image stored in the predicted-image storing unit 107 and the input image 114, a transforming unit 102 configured to subject the predicted difference image to orthogonal transformation such as DCT, a quantizing unit 103 configured to quantize a transformed signal, and a variable-length encoding unit 104 configured to encode the quantized signal. The image encoding device outputs an encoded stream 115. CU size prediction processing in the CU dividing unit 100 is explained below.

The moving image encoding device includes two prediction processing systems in order to generate the predicted image. A first system is a system by inter-prediction. In order to obtain a reference image for the next input image, the first system includes an inverse quantization unit 109 configured to inversely quantize the quantized signal output by the quantizing unit 103, an inverse transformation unit 108 configured to inversely transform the inversely quantized signal and obtain a predicted difference image, an adder 111 configured to add up the inversely transformed predicted difference image and the predicted image from the predicted-image storing unit 107, and a deblock processing unit 112 configured to obtain a reference image by removing a block noise from an added-up image. The first system further includes a reference-image storing unit 113 configured to store the obtained reference image and an inter-prediction unit 106 configured to perform motion prediction between the reference image stored in the reference-image storing unit 113 and the input image 114. A second system is a system by intra-prediction. The second system includes an intra-prediction unit 105 configured to perform intra-screen prediction from the input image 114.

A prediction-mode determining unit 110 selects a predicted image evaluated as having highest prediction efficiency of inter-predicted images from the two prediction processing systems, i.e., the inter-predicted image from the inter-prediction unit 106 and the intra-screen predicted image from the intra-prediction unit 105. As an evaluation index for the prediction efficiency, predicted error energy is used. However, a predicted image (i.e., a prediction mode) may be used taking into account similarity to a prediction system for a CU in the vicinity (inter-screen prediction or intra-screen prediction). The selected predicted image is stored in the predicted-image storing unit 113 and used for generating a predicted difference image between the predicted image and the input image 114. Information concerning the prediction mode (a combination of a type of inter-prediction and intra-prediction and the size of a prediction unit block) is sent to the variable-length encoding unit 104 and stored in a part of the encoded stream 115.

This embodiment has a characteristic in the configuration including the CU dividing unit 100 and the CU-size storing unit 116. The characteristic is explained in detail below.

<Processing Content of the CU Dividing Unit (Encoding Side)>

Processing content of the CU dividing unit 100 is explained in detail below with reference to the drawings.

Figure 5:
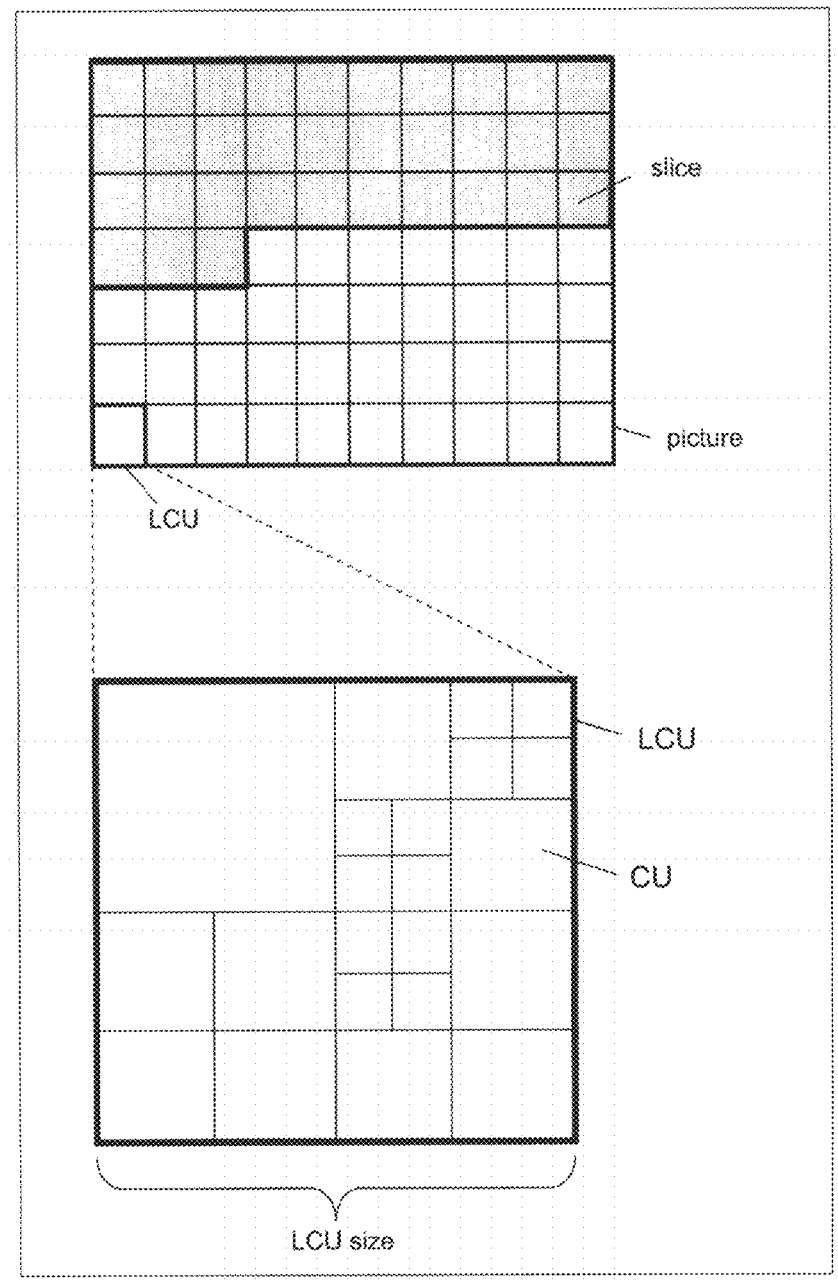
FIG. 5 is a diagram for explaining a concept of CU division.

FIG. 5 is a diagram for explaining a concept of a CU. In this embodiment, an encoding processing unit block equivalent to the macroblock of the related art is described as CU (Coding Unit). In this embodiment, characteristics explained below are provided for the CU. However, the CU is not limited to the characteristics.

(1) The CU is square. (The CU may be rectangular.)
(2) A maximum size and a minimum size of the CU are described in an encoded stream or shared by the encoding side and the decoding side by being defined as standards.
(3) The CU can be hierarchically divided into four at the maximum three times by a quad tree structure (a tree structure of four layers in total). (A tree structure and layers that can be applied are generalized as an m-ary tree structure (m is an arbitrary integer) and n layers (n is an integer equal to or larger than 2)).

In FIG. 5, the CU having the maximum size is described as LCU (Largest Coding Unit) and the size (the number of pixels in the longitudinal or lateral direction of the LCU) is described as LCU size. In this embodiment, the LCU size is a power of 2 but is not limited to this.

As shown in FIG. 5, one picture is divided in an LCU unit. A set of continuous LCUs is defined as slice. This concept is equivalent to the macroblock of the related art. Each of the respective LCUs is hierarchically formed by the quad tree structure.

Figure 6:
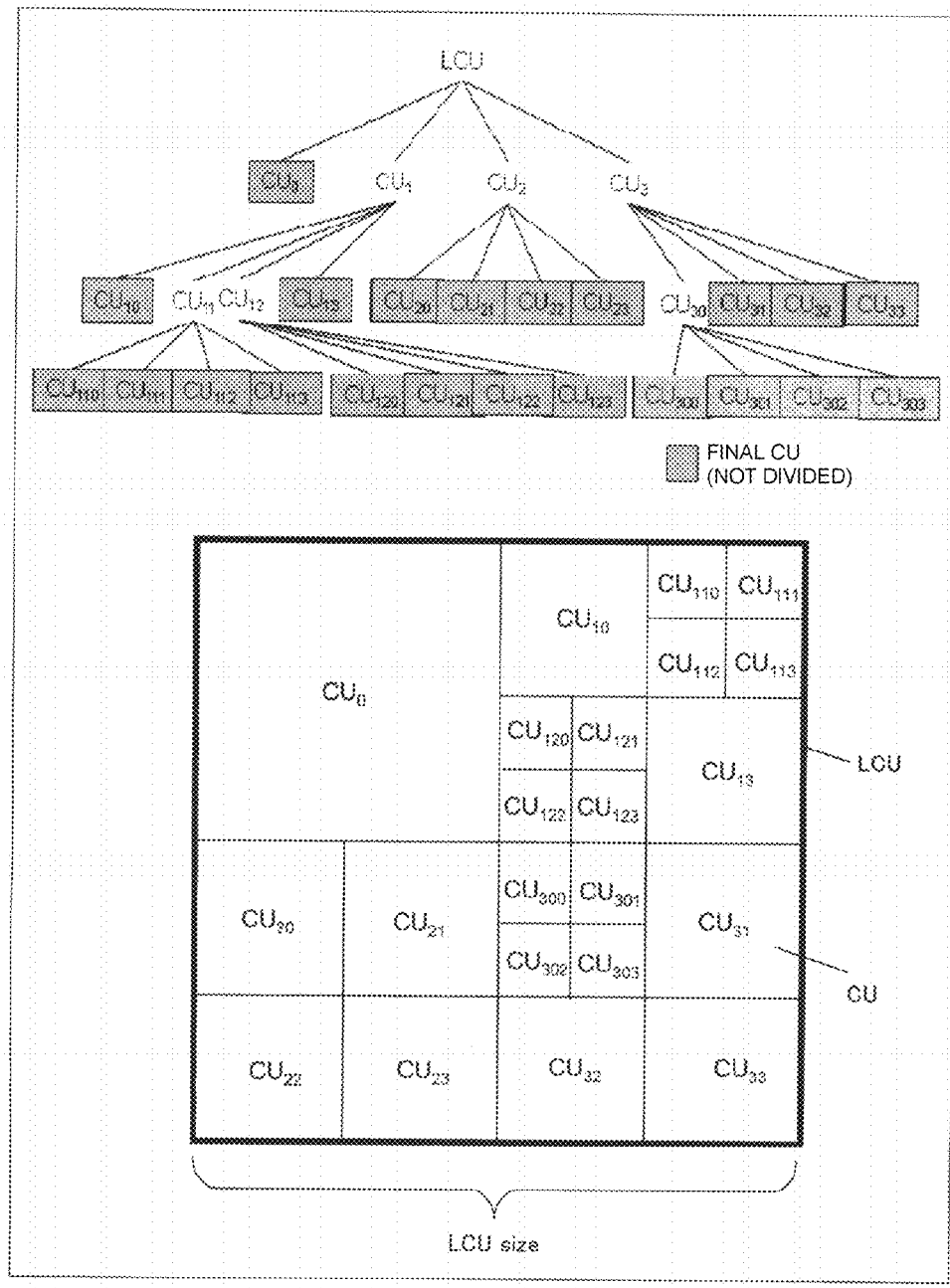
FIG. 6 is a diagram for explaining an example of CU division of a quad tree structure.

FIG. 6 is a diagram showing an example of division of the CU formed by the quad tree structure. As shown in the figure, the LCU is divided into four CUs, i.e., a $CU_0$, a $CU_1$, a $CU_2$, and a $CU_3$. The $CU_0$ is not divided and finally decided as the CU. The $CU_1$ is divided into four CUs, i.e., a $CU_{10}$, a $CU_{11}$, a $CU_{12}$, and a $CU_{13}$. The $CU_2$ is divided into four CUs, i.e., a $CU_{20}$, a $CU_{21}$, a $CU_{22}$, and a $CU_{23}$. The $CU_3$ is divided into four CUs, i.e., a $CU_{30}$, a $CU_{31}$, a $CU_{32}$, and a $CU_{33}$. The $CU_{11}$ is further divided into four CUs, i.e., a $CU_{110}$, a $CU_{111}$, a $CU_{112}$, and a $CU_{113}$. The $CU_{12}$ is further divided into four CUs, i.e., a $CU_{120}$, a $CU_{121}$, a $CU_{122}$, and a $CU_{123}$. The $CU_{30}$ is further divided into four CUs, i.e., a $CU_{300}$, a $CU_{301}$, a $CU_{302}$, and a $CU_{303}$. The CUs other than the $CU_{11}$, the $CU_{12}$, and the $CU_{30}$ are finally decided as the CUs. In this way, the LCU is hierarchically divided into four. The division can be performed until the size of the CUs is reduced to the minimum size.

In the case of the quad tree structure, when a ratio of the maximum size and the minimum size is $2^N$ (an n-th power of 2), if a flag indicating whether each of the CUs is divided is represented by 1 bit as in the related art, an information amount of maximum ($4^N$) bits is required for each of the LCUs. Therefore, as the ratio of the maximum size and the minimum size of the CU is larger, the information amount for indicating the size information of the CU increases.

Therefore, this embodiment is characterized in that, for each of the CUs, prediction concerning whether the present CU is divided into four is performed using size information of peripheral CUs (spatially peripheral CUs) and CUs of preceding and following pictures (temporally peripheral CUs (a co-located CU and CUs around the co-located CU)) and the CU is divided according to a result of the prediction. Consequently, the size information of the CU is unnecessary, i.e., the flag is unnecessary. Therefore, a reduction in the information amount can be expected.

An example of syntax of the encoded stream of the CU in this embodiment is explained with reference to FIG. 7. In the figure, currCUSize indicates the size (the number of pixels of one side) of an encoding target CU and a function coding_unit( ) indicates encoded syntax of a CU in a pixel position (x0, y0) and indicated by currCUSize. PicWidth is picture width (the number of pixels), PicHeight is picture height (the number of pixels), and MinCUSize is the minimum size of the CU.

In the figure, use_pred_split_flag is a flag of one bit indicated by whether a predicted CU division pattern is applied to the present LCU ("1") or not ("0"). The flag is stored only when the present CU is the LCU.

When use_pred_split_flag is 1, pred_split_flag is substituted in split_flag (L701). In the figure, pred_split_flag is a flag indicating a predicted value concerning whether the present CU is divided (1) or not (0) and split_flag is a flag indicating whether the present CU is divided (1) or not (0). Both the flags are represented by one bit. That is, when use_pred_split_flag is 1, since the present CU is divided according to a predicted division pattern, information of split_flag is unnecessary. A method of predicting whether the present CU is divided is explained below.

If use_pred_split_flag is 0, information of 1 bit of split_flag is stored in the encoded stream (L702).

If split_flag is 1, the present CU is divided into four. In this case, a size splitCUSize of the divided CU is set to ½ of the size currCUSize of the present CU and a dividing position x1 in the lateral direction and a dividing position y1 in the longitudinal direction are respectively set as x1=x0+splitCUSize and y1=y0+splitCUSize (L7203). The four divided CUs ($CU_0$ to $CU_3$) are stored by recursively invoking coding_unit( ) (L704 to L707). In each of the four divided CUs, similarly, it is designated by use_pred_split_flag or split_flag whether division is further performed. Such recursive invocation is performed as long as the CU size is equal to or larger than MinCUSize.

If split_flag is 0, this CU is decided as an encoding unit. Information concerning prediction processing, which is main processing of encoding, (a function prediction unit( )) (L708) and orthogonal transformation information of a predicted error (a function transform unit( )) (L709) are stored. Details of the prediction processing and the orthogonal transformation processing are not explained.

<Processing Content of the Block Dividing Unit>

Processing content of the block dividing unit 100 according to the first embodiment is explained. The block dividing unit 100 determines a division pattern in LCUs in a picture by predicting the division pattern using the size of peripheral CUs and the size of CUs of preceding and following pictures of the LCUs.

(1) Overview of the Overall Processing

Figure 8:
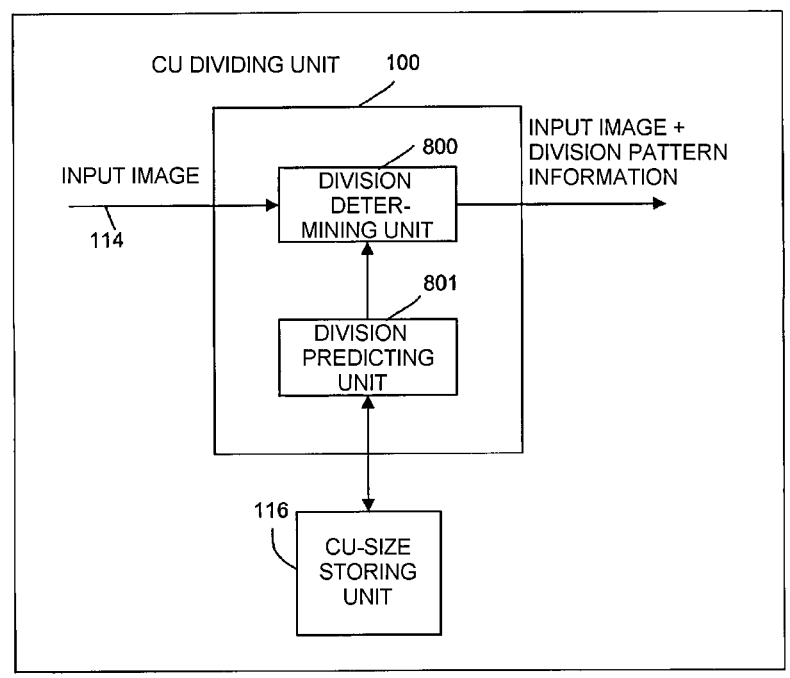
FIG. 8 is a diagram showing a schematic configuration of a CU dividing unit (in the encoding device).

FIG. 8 is a diagram showing the configuration of the block dividing unit 100.

The block dividing unit 100 includes a division determining unit 800 and a division predicting unit 801. The division determining unit 800 determines an optimum block division pattern on the basis of the input image 114. The division determining unit 800 compares a block division pattern predicted by the division predicting unit 801 and the optimum block division pattern and determines whether the predicted block division pattern is used or another block division pattern is used.

(2) Overview of the Division Determining Unit

First, the division determining unit 800 determines an optimum CU division pattern on the basis of the input image 114. In this embodiment, a method of determining the optimum CU division pattern is not limited. However, it is possible to adopt a method of determining an optimum division pattern for a certain CU by calculating dispersion in the case of division of the CU and performing threshold determination to thereby determine whether the CU is divided. Alternatively, when a large arithmetic processing amount is allowed, prediction processing may be performed in all division patterns to determine an optimum division pattern to minimize a predicted error.

Subsequently, the division determining unit 800 evaluates the block division pattern predicted by the division predicting unit 801 and determines whether the predicted CU division pattern is set as a division pattern or the optimum division pattern is set as the division pattern.

Examples of this determination method include a method of, when presence or absence of division is different in a predicted block pattern and an optimum block pattern, selecting the predicted block pattern or the optimum block pattern by evaluating a dispersion value of divided CUs of the patterns using a threshold and determining whether the CU is divided.

(3) Details of the Division Predicting Unit

CU division prediction processing in the division predicting unit 801 is explained below.

Figure 9:
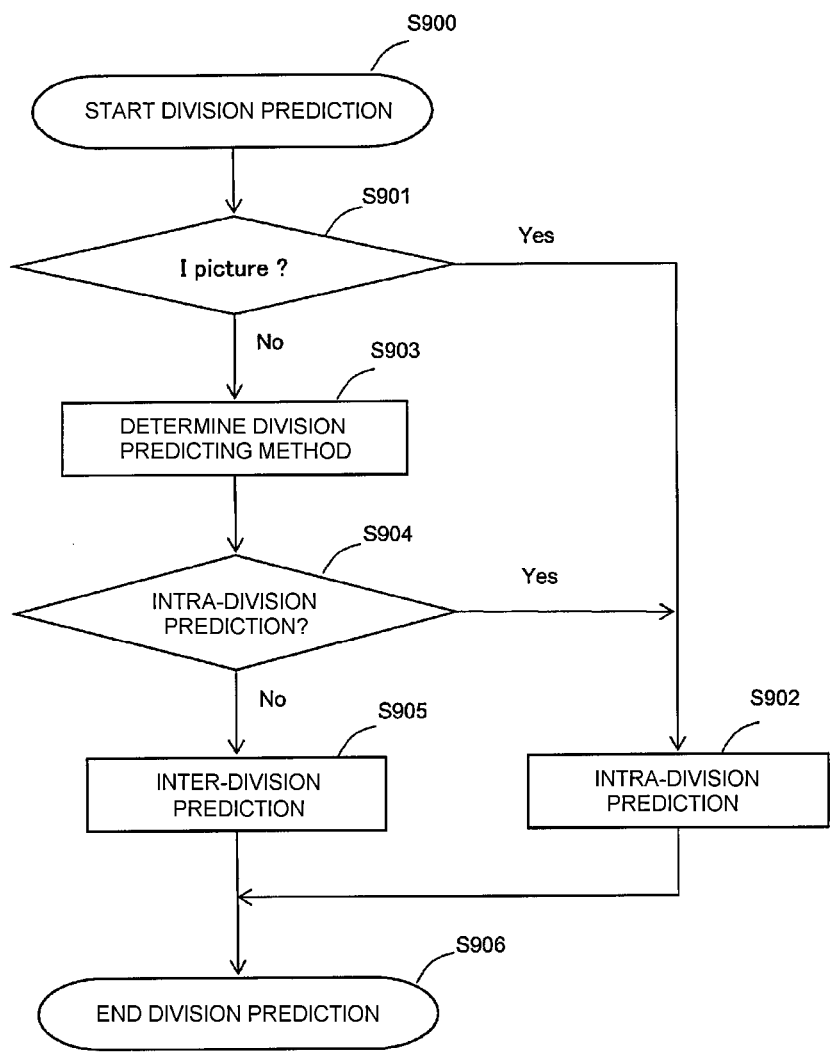
FIG. 9 is a flowchart for showing a flow of division prediction processing.

FIG. 9 is a flowchart for showing a flow of the division prediction processing. A method of predicting a division pattern of a CU is divided into an intra-division predicting method in which size information of peripheral encoded CUs in the same picture is used and an inter-division predicting method in which size information of encoded CUs of preceding and following pictures is used.

In FIG. 9, after starting the division prediction processing in step S900, in step S901, the division predicting unit 801 determines whether the present picture is an I picture. If the present picture is the I picture, the division predicting unit 801 applies intra-division prediction processing explained below to all CUs (step S902). If the present picture is a picture other than the I picture (a P picture or a B picture), the division predicting unit 801 performs determination concerning whether division determination prediction processing explained below is performed (step S903). When it is determined in step S903 that intra-division prediction is performed, the division predicting unit 801 performs the intra-division prediction (step S902). When it is determined in step S903 that inter-division prediction is performed, the division predicting unit 801 performs the inter-division prediction (step S905) and ends the division prediction processing (step S906).

(4) Details of the Intra-Division Prediction (Step S902)

The intra-division prediction processing in step S902 in FIG. 9 is explained with reference to FIG. 10. In the processing in step S902, a flow explained below is executed.

First, the division predicting unit 801 performs the division determination processing from an LCU. For the division determination processing, in step S1001, the division predicting unit 801 sets the present CU size currCUSize as the size of the LCU. Subsequently, the division predicting unit 801 applies intra-division determination processing (step S1003) explained below to all CUs having currCUSize. Thereafter, the division predicting unit 801 reduces currCUSize to ½ (step S1004). If currCUSize is larger than the minimum size MinCUSize of the CUs (step S1005), the division predicting unit 801 returns to step S1002 and applies the intra-division determination processing (step S1003) explained below to all the CUs having the size of currCUSize. If currCUSize is equal to or smaller than the minimum size MinCUSize of the CUs, the division predicting unit 801 ends the intra-division prediction processing without further performing division processing (step S1006).

Figure 11:
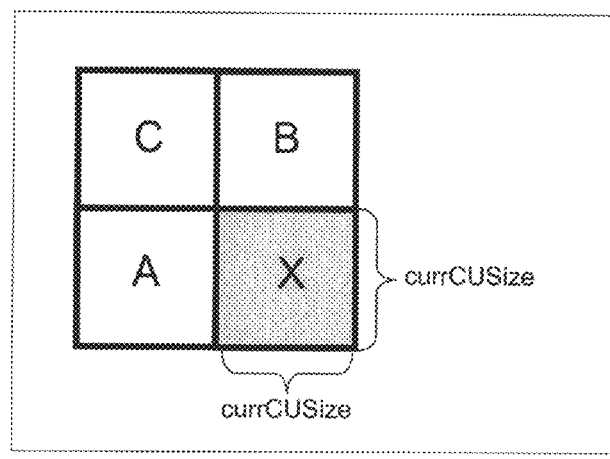
FIG. 11 is a diagram for explaining the intra-division prediction processing.
Figure 12:
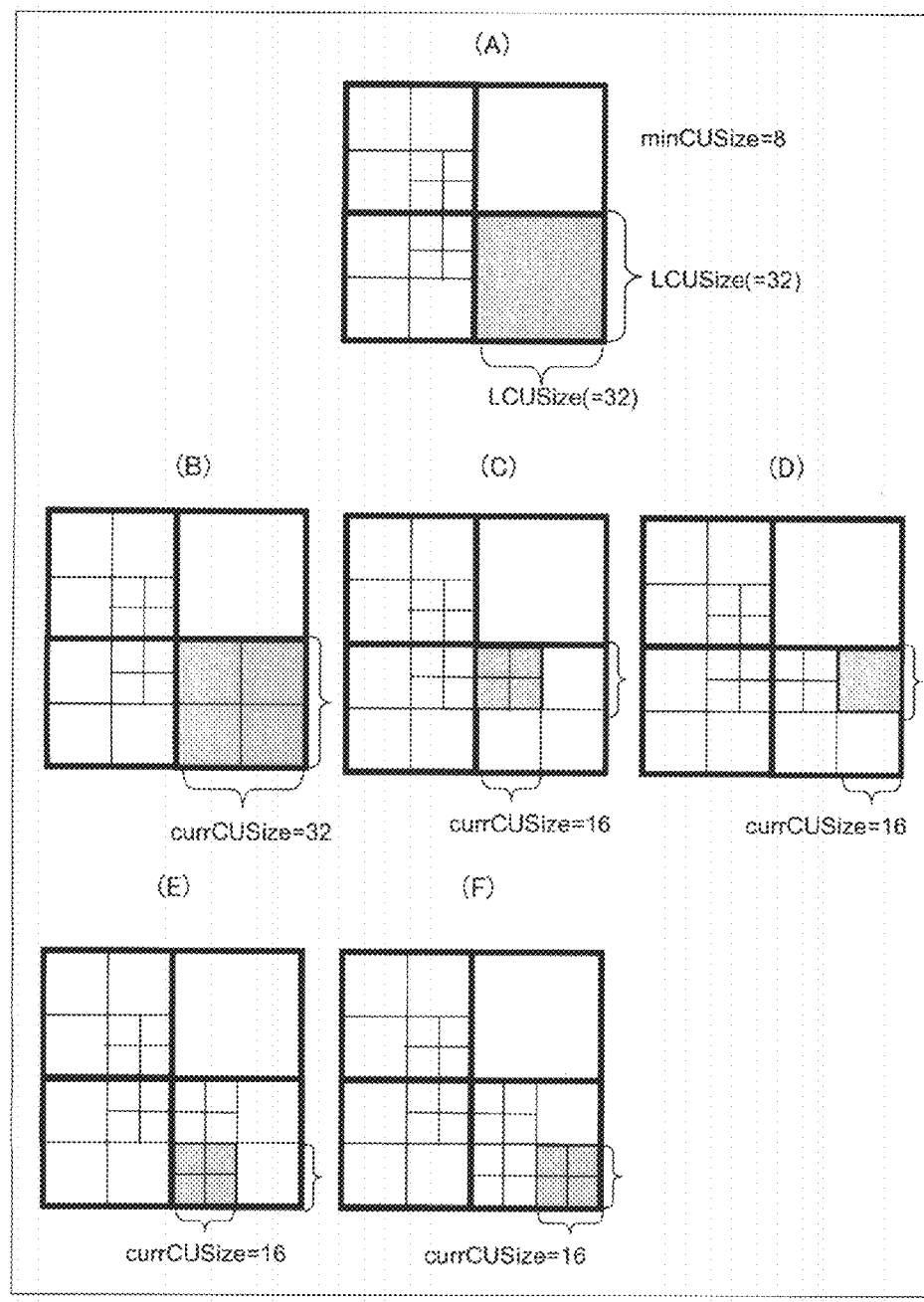
FIG. 12 is a diagram for explaining an example of the intra-division prediction processing.

An example of the intra-division determination processing (step S1003) is explained with reference to FIGS. 11 and 12. FIG. 11 shows a positional relation between an encoding target CU and CUs referred to in order to perform the intra-division determination processing in the first embodiment. As shown in the figure, the division predicting unit 801 determines presence or absence of division of an encoding target CU(X) referring to three CUs having the same size, i.e., a left CU (A in the figure), an upper CU (B in the figure), and an upper left CU (C in the figure) of the encoding target CU(X). In this embodiment, as a method of determining presence or absence of division of the encoding target CU(X), a method of determining whether each of the left CU, the upper CU, and the upper left CU is divided and applying the CU divided more to the encoding target CU is adopted. However, other methods may be adopted as long as the presence or absence of division of the encoding target CU (X) can be determined using presence or absence of division of peripheral encoded CUs.

A specific example of the intra-division prediction in step S902 is explained with reference to FIG. 12. First, it is assumed that a certain LCU and CUs having the same size (i.e., LCUs) around the LCU are in a divided state shown in FIG. 12 (A) and LCUSize=32 and MinCUSize=8.

In the case of FIG. 12(A), left and upper left LCUs of the encoding target CU are divided and an upper LCU is not divided. Therefore, the division predicting unit 801 divides the encoding target CU according to the majority rule explained above (FIG. 12(B)). Since a CU having a CU size of 32 is only the LCU, the division predicting unit 801 halves currCUSize to currCUSize=16 (step S1004 in FIG. 10). Since currCUSize=16 is larger than MinCUSize=8 (step S1005 in FIG. 10), the division predicting unit 801 starts processing of a CU having a CU size of 16 (steps S1002 and S1003 in FIG. 10).

In FIG. 12(B), the division predicting unit 801 sets an upper left CU (a CU size=16) of the divided encoding target CU as the next encoding target CU. In FIG. 12(C), since the left CU and the upper left CU are divided, the encoding target CU is determined as "being divided" according to the majority rule. The division predicting unit 801 moves the encoding target CU to the right in raster scan order.

In FIG. 12(D), the left CU is divided and the upper left CU and the upper CU are not divided. Therefore, the encoding target CU is determined as "not being divided" according to the majority rule. The division predicting unit 801 moves the encoding target CU to the lower left in raster scan order.

In FIG. 12(E), the left CU is not divided and the upper left CU and the upper CU are divided. Therefore, the encoding target CU is determined as "being divided" according to the majority rule. The division predicting unit 801 moves the encoding target CU to the lower right in raster scan order.

In FIG. 12(F), the left CU and the upper left CU are divided and the upper CU is not divided, the encoding target CU is determined as "being divided" according to the majority rule.

Figure 10:
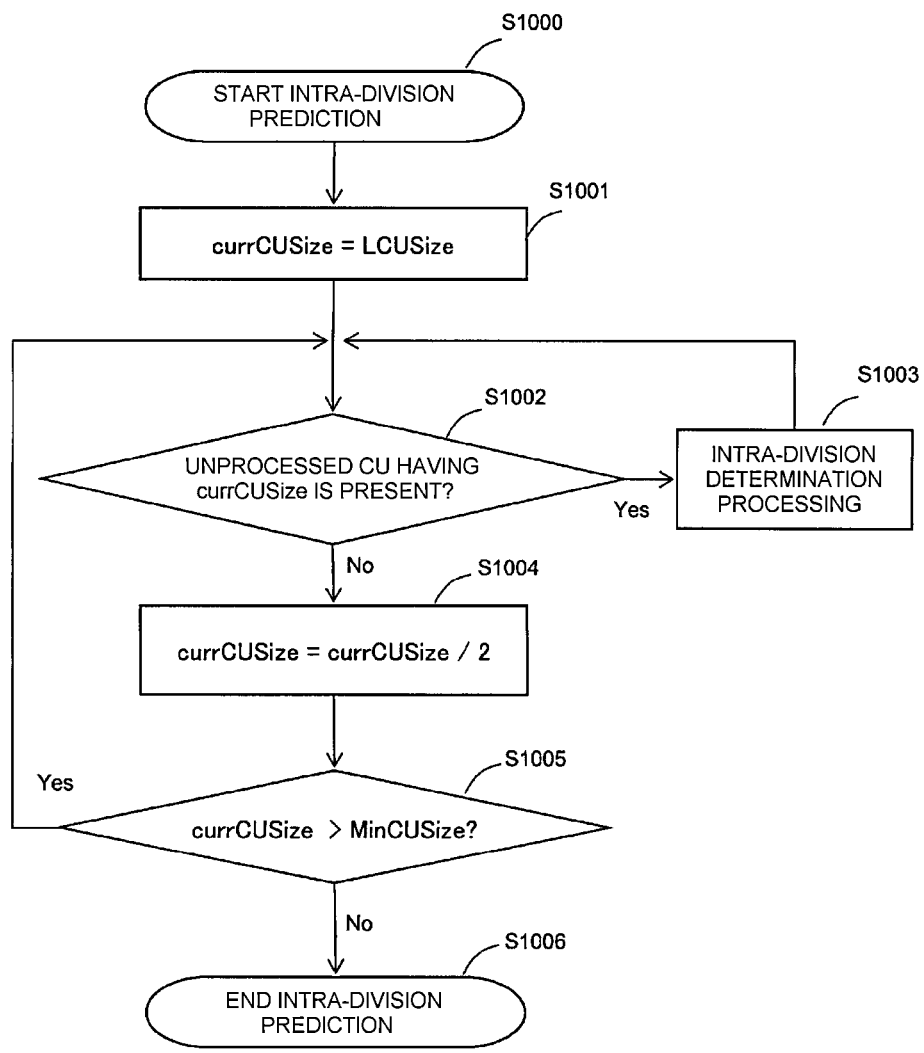
FIG. 10 is a flowchart for showing a flow of intra-division prediction processing.

Since there is no more CU having the CU size of 16 (step S1002 in FIG. 10), the division predicting unit 801 halves currCUSize to currCUSize=8 (step S1004 in FIG. 10). Since currCUSize=8 is equal to MinCUSize=8 (step S1005 in FIG. 10), the division predicting unit 801 ends the intra-division prediction processing.

According to the flow explained above, it is possible to predict, with the intra-division prediction processing, a division pattern of the encoding target LCU from the size information of the peripheral LCUs of the encoding target LCU.

In the example explained above, all the left, upper left, and upper three CUs of the encoding target LCU are present. However, in a picture boundary or a slice boundary, in some case, all the three CUs cannot be referred to for the intra-division prediction.

Figure 13:
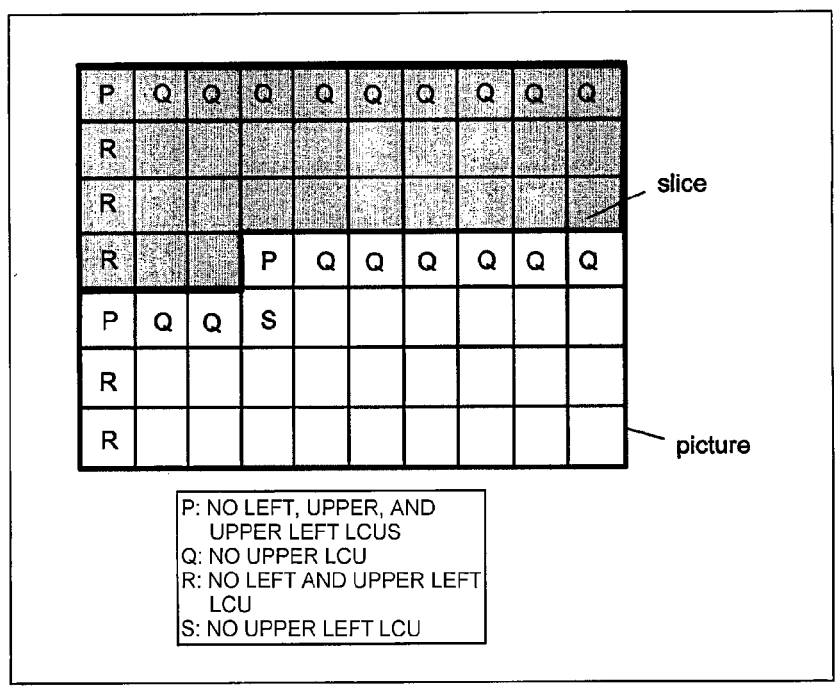
FIG. 13 is a diagram for explaining the intra-division prediction processing near a picture boundary and a slice boundary.

FIG. 13 is a diagram for explaining LCUs used for intra-division prediction in the picture boundary or the slice boundary. A slice is a set of continuous LCUs. Prediction is not performed across different slices. However, the prediction should not always be performed across the different slices.

In FIG. 13, all of left LCUs, upper LCUs, and upper left LCUs of LCUs in positions indicated by P (where there are no left, upper, and upper left LCUs) are absent. Therefore, the intra-division prediction is not performed in the LCUs in the positions of P.

In FIG. 13, uppers LCU and upper lefts LCU of LCUs in positions indicated by Q (where there is no upper LCU) are absent. Therefore, the intra division prediction is performed using only division patterns of left LCUs in the LCUs in the positions of Q.

In FIG. 13, left LCUs and upper left LCUs of LCUs in positions indicated by R (where there are no left, upper, and upper left LCUs) are absent. Therefore, the intra-division prediction is performed using only division patterns of upper LCUs in the positions of R.

In FIG. 13, an upper left LCU of an LCU in a position indicated by S is absent. Therefore, the intra-division prediction is performed using division patterns of a left LCU and an upper LCU in the LCU in the position of S. However, in a CU (a CU size is LCUSize/2) located in the upper left of the LCU, since only the two LCUs, i.e., the upper LCU and the left LCU can be referred to, the majority rule cannot be applied when both the division patterns are different. In such a case, it is determined in advance as a rule which of the division patterns is used (in this embodiment, the left LCU is prioritized).

(5) Details of the Division Predicting Method Determination (step S903)

The division predicting method determination processing in step S903 in FIG. 9 is explained. The processing in step S903 is executed in a flow explained below.

Figure 14:
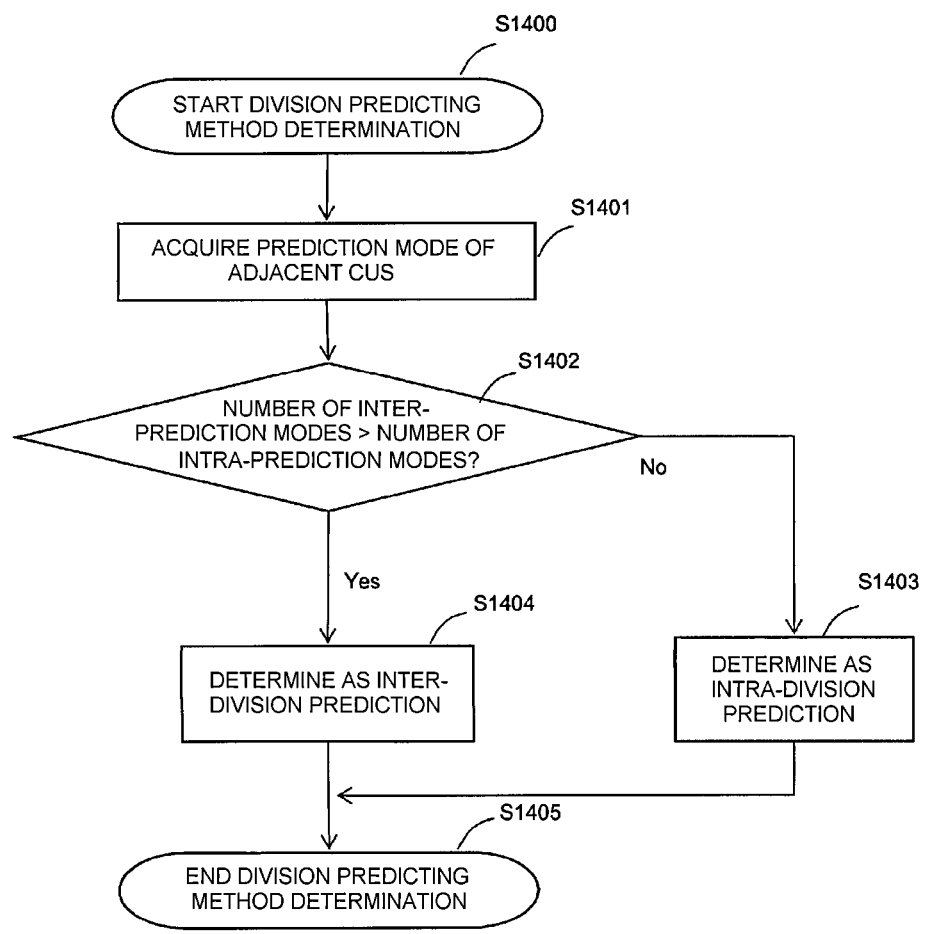
FIG. 14 is a flowchart for showing a flow of determination processing of a division predicting method.

FIG. 14 is a flowchart for showing a flow of the division predicting method determination (step S903) processing.

Figure 15:
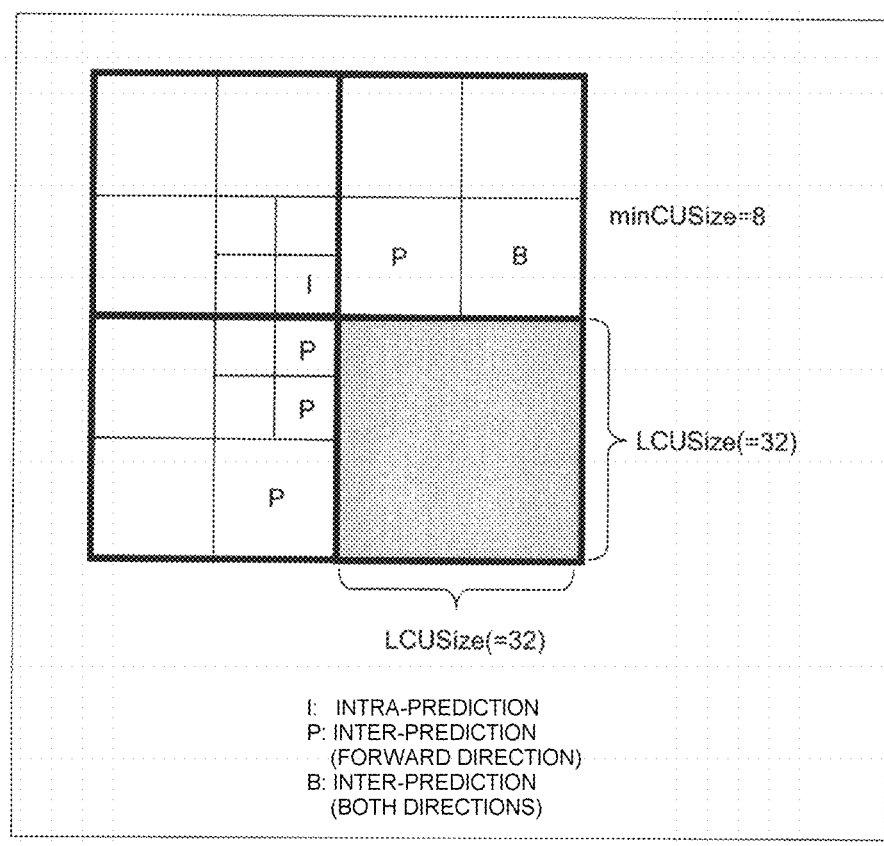
FIG. 15 is a diagram for explaining an example of the determination processing of the division predicting method.

When the division predicting method determination processing for a certain LCU is started (step S1400), first, the division predicting unit 801 acquires prediction mode information of all CUs adjacent to the LCU. FIG. 15 is a diagram for explaining acquisition processing for the prediction mode information. In the figure, a CU for which the intra-prediction is performed is described as "I", CUs for which the inter-prediction in the forward direction is performed are described as "P", and a CU for which the inter-prediction in both the directions is performed is described as "B". The sizes of the CUs may be different. However, when the number of prediction modes is counted, the sizes are converted into the same CU size to count the number of prediction modes. For example, in the figure, in a CU of 8 pixels×8 pixels, one CU I and two CUs P are present. In a CU of 16 pixels×16 pixels, two CUs P and one CU B are present. When the CU sizes are different in this way, the number of CUs is converted into the number of CUs of 8 pixels×8 pixels. The two CUs P of 16 pixels×16 pixels are converted into four CUs P of 8 pixels×8 pixels. Similarly, one CU B of 16 pixels×16 pixels is converted into two CUs B of 8 pixels×8 pixels.

In FIG. 14, in step S1402, the division predicting unit 801 compares the number of inter-prediction modes and the number of intra-prediction modes. In the example explained above, since the CU I is in the intra-prediction mode and the CUs P and B are in the inter-prediction mode, the number of inter-prediction modes is obtained as 8 and the number of intra-prediction modes is obtained as 1. If the number of intra-prediction modes is equal to or larger than the number of inter-prediction modes in step S1402, the division predicting unit 801 selects the intra-division prediction as a division predicting method (step S1403). If the number of intra-prediction modes is smaller than the number of inter-prediction modes, the division predicting unit 801 selects the inter-division prediction as the division predicting method (step S1404).

That is, in the division predicting method determination processing (step S903), the division predicting unit 801 collects information indicating whether the intra-prediction mode is selected or the inter-prediction mode is selected for the peripheral CUs and selects the division predicting method according to the prediction mode selected more. However, the selecting method explained above is an example. Other selecting methods may be adopted as long as the division predicting method for the encoding target LCU can be determined with reference to information concerning the peripheral CUs. The division predicting method for the encoding target LCU may be determined with reference to not only the information concerning the peripheral CUs but also information concerning CUs of preceding and following pictures.

(6) Details of the Inter-Division Prediction (Step S905).

Figure 16:
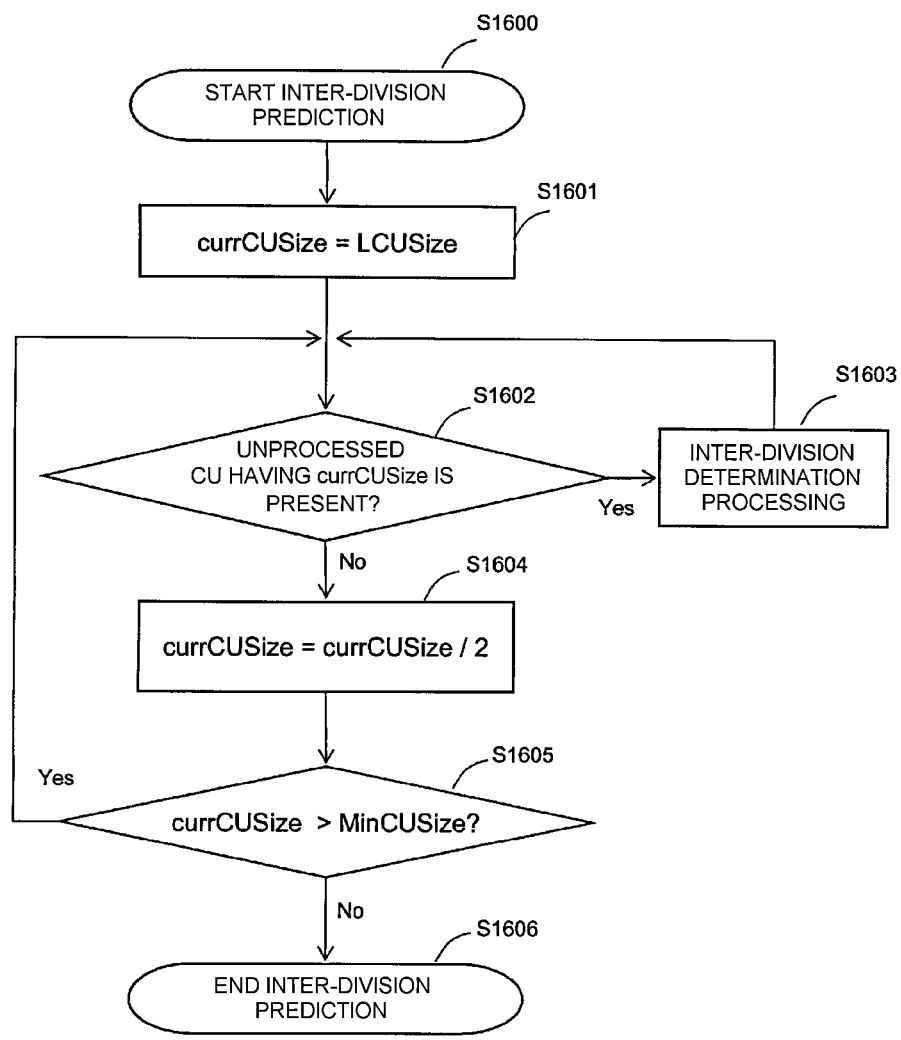
FIG. 16 is a flowchart for showing a flow of inter-division prediction processing.

The inter-division prediction processing in step S905 in FIG. 9 is explained with reference to FIG. 16. The processing in step S905 is executed in a flow explained below.

First, the division predicting unit 801 performs the division determination processing from an LCU. For the division determination processing, in step S1601, the division predicting unit 801 sets the present CU size currCUSize as the size of the LCU. Subsequently, the division predicting unit 801 applies inter-division determination processing (step S1603) explained below to all CUs having currCUSize. Thereafter, the division predicting unit 801 reduces currCUSize to ½ (step S1604). If currCUSize is larger than the minimum size MinCUSize of the CUs (step S1605), the division predicting unit 801 returns to step S1602 and applies the inter-division determination processing (step S1603) explained below to all the CUs having the size of currCUSize. If currCUSize is equal to or smaller than the minimum size MinCUSize of the CUs, the division predicting unit 801 ends the inter-division prediction processing without further performing division processing (step S1606).

Figure 17:
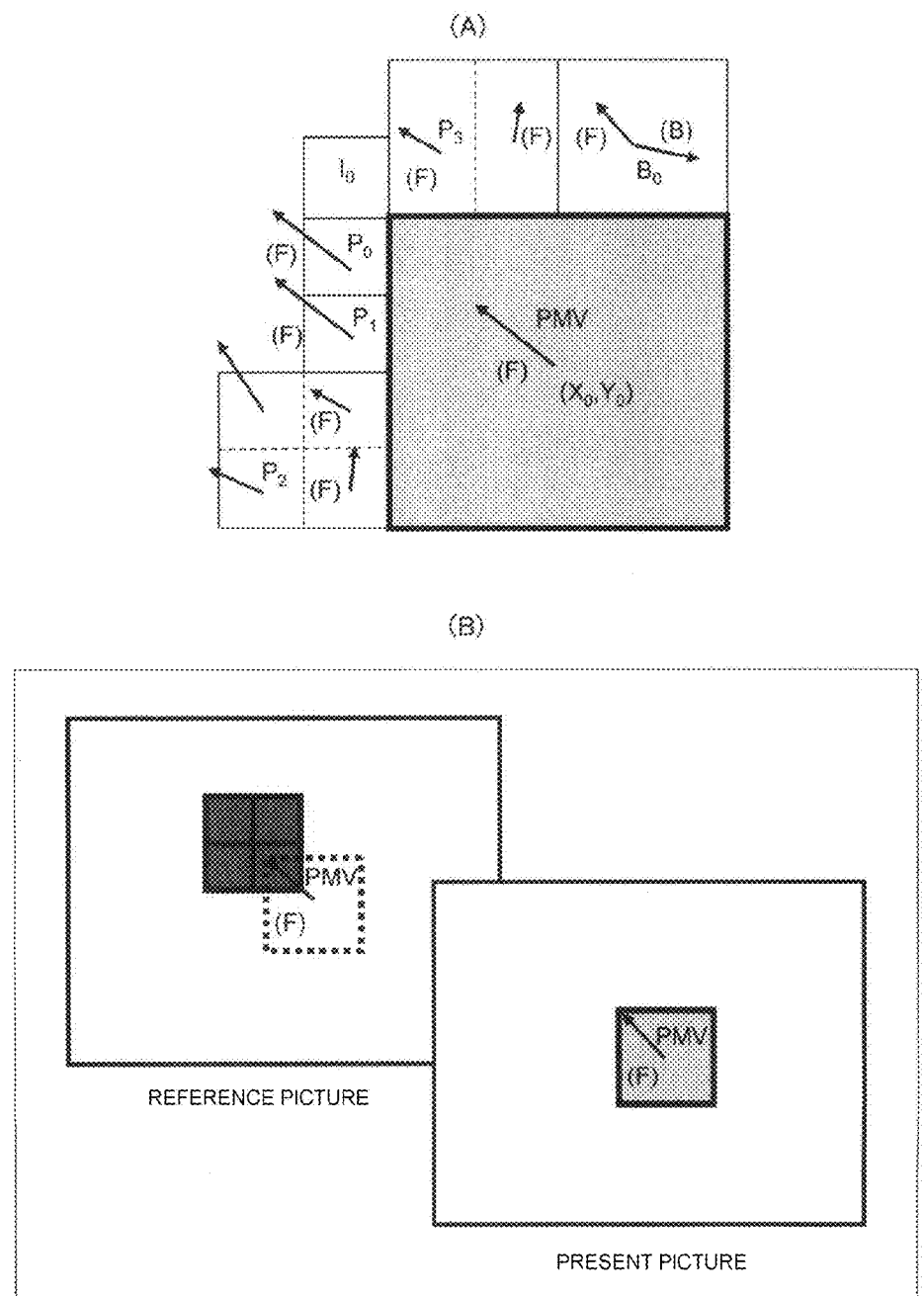
FIG. 17 is a diagram for explaining an example of the inter-division prediction processing.
Figure 18:
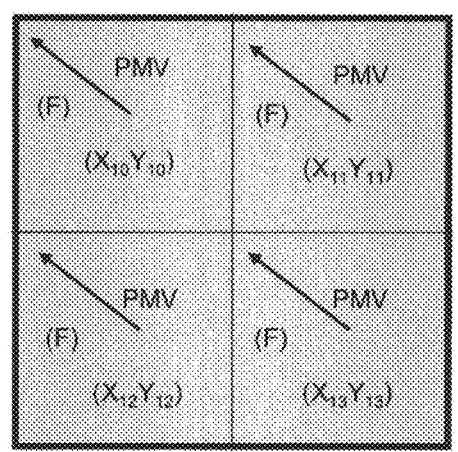
FIG. 18 is a diagram for explaining an example of the inter-division prediction processing.

An example of the inter-division determination processing (step S1603) is explained with reference to FIG. 17. In FIG. 17(A), in the encoding target LCU, a motion vector of the encoding target LCU is predicted on the basis of motion vectors of encoded peripheral CUs. The predicted motion vector is described as PMV. In FIG. 17(A), an arrow represents the motion vectors. (F) affixed to arrows represents motion vectors for referring to a forward picture. (B) represents a motion vector for referring to a backward picture. In FIG. 17(A), in the inter-prediction processing for the inside of a CU, the CU is further divided into prediction units of 2×2, 2×1, and 1×2 in an aspect ratio. Motion vectors can be set in each of the prediction units. However, this rule of the division of the prediction units is an example. In FIG. 17(A), motion vectors are set in a prediction unit of 8 pixels×8 pixels for a CU ($P_0$), CU ($P_1$), and CU ($P_2$). A motion vector for referring to the forward picture is set in a prediction unit of 8 pixels×16 pixels for a CU ($P_3$). Bi-directional prediction is performed in a prediction unit of 16 pixels×16 pixels for a CU ($B_0$). A vector for referring to the forward picture and a vector for referring to the backward picture are set for the CU ($B_0$).

Examples of a method of predicting the motion vector of the encoding target LCU from the motion vectors of the peripheral CUs shown in FIG. 17(A) include a method of selecting a reference direction for forward reference or backward reference among the motion vectors of the peripheral CUs and setting a median of the motion vector in the selected reference direction as a predicted value. That is, in the example shown in FIG. 17(A), since there are more motion vectors for referring to the forward picture described as P, the forward picture reference direction is selected as the PMV. A median of all the motion vectors for referring to the forward picture of the CU($P_0$), CU($P_1$), CU($P_2$), CU($P_3$), and CU($B_0$) is set as the PMV. That is, a set of a median of X components and a median of Y components of all the motion vectors is set as the PMV. In this case, the sizes of prediction units of the motion vectors may be taken into account. That is, the CU($P_0$) to the CU($P_3$) are adjacent to the encoding target LCU in a prediction unit of an 8-pixel size. However, the CU($B_0$) is adjacent to the encoding target LCU in a prediction unit of a 16-pixel size. Therefore, a motion vector in the CU($B_0$) may be interpreted as including two motion vectors in the prediction unit of the 8-pixel size.

In the example explained above, the PMV is determined according to the median. However, an average of all the motion vectors may be calculated and set as the PMV. As a method of determining the PMV, other methods may be used as long as the PMV can be uniquely calculated from motion vectors of peripheral encoded CUs.

FIG. 17(B) indicates an example of a method of predicting, using the PMV of the encoding target LCU determined as explained above, whether division of the encoding target LCU is performed. In the figure, a center coordinate of the LCU is set as ($X_0$, $Y_0$). The size of a CU including pixels in a position on a reference picture in a position moved from the ($X_0$, $Y_0$) position by the PMV (hereinafter referred to as reference position) is referred to. If the CU size in the reference position is smaller than the size of the encoding target CU, it is determined that the CU is divided. If the CU size in the reference position is equal to or larger than the size of the encoding target CU, it is determined that the CU is not divided. In FIG. 17(B), a reference position of an LCU of the present picture is divided into a size smaller than an LCU size on the reference picture (in FIG. 17(B), a portion of a dark gray). Therefore, it is determined that the encoding target LCU is divided. CU size information in the reference picture is stored in the block-size storing unit 116.

An example in which the inter-division determination processing (step S1603) is applied to divided CUs (CUs having a size smaller than an LCU) is explained.

In the example shown in the figure, the division predicting unit 801 determines, using the PMV of the encoding target LCU determined above, referring to the CU size in the reference position by the PMV of each of the divided CUs, whether each of the CUs is further divided. That is, the division predicting unit 801 sets center coordinates of the divided CUs respectively as ($X_{10}$, $Y_{10}$), ($X_{11}$, $Y_{11}$), ($X_{12}$, $Y_{12}$), and ($X_{13}$, $Y_{13}$) and determines, referring to CU sizes in reference positions shifted from the respective center coordinates by the PMV, as in the determination in the LCU, whether each of the divided CUs is further divided.

If the reference positions by the PMV indicate the outside of the picture, the reference positions only have to be replaced with pixel positions in the vicinity. For example, if X coordinates of the reference positions are smaller than 0 or equal to or larger than a maximum value (PicWidth−1), each of the X coordinates of the reference positions only has to be replaced with 0 or PicWidth−1. Similarly, if Y coordinates of the reference positions are smaller than 0 or equal to or larger than a maximum value (PicHeight−1), each of the Y coordinates of the reference positions only has to be replaced with 0 or PicHeight−1.

Consequently, in the inter-division prediction (step S905), the division predicting unit 801 predicts a division pattern of the inside of the encoding target LCU referring to motion vector information of the adjacent encoded CUs. The predicting method explained above is an example. Any predicting method can be applied as long as the motion vector information of the adjacent encoded CUs is used. The motion vectors may be regarded as zero and a CU size in a reference position same as the encoding target CU may be referred to.

Consequently, the block dividing unit 100 in the image encoding device according to this embodiment refers to information concerning the peripheral CUs and the CUs on the reference picture, predicts a division pattern of the encoding target LCU, and, when the encoding target LCU is divided according to the predicted pattern, stores only flag information indicating to that effect in the encoded stream. Consequently, it is possible to realize improvement of a compression ratio by reducing the division pattern information of the encoding target LCU.

<Configuration of an Image Decoding Device>

Figure 19:
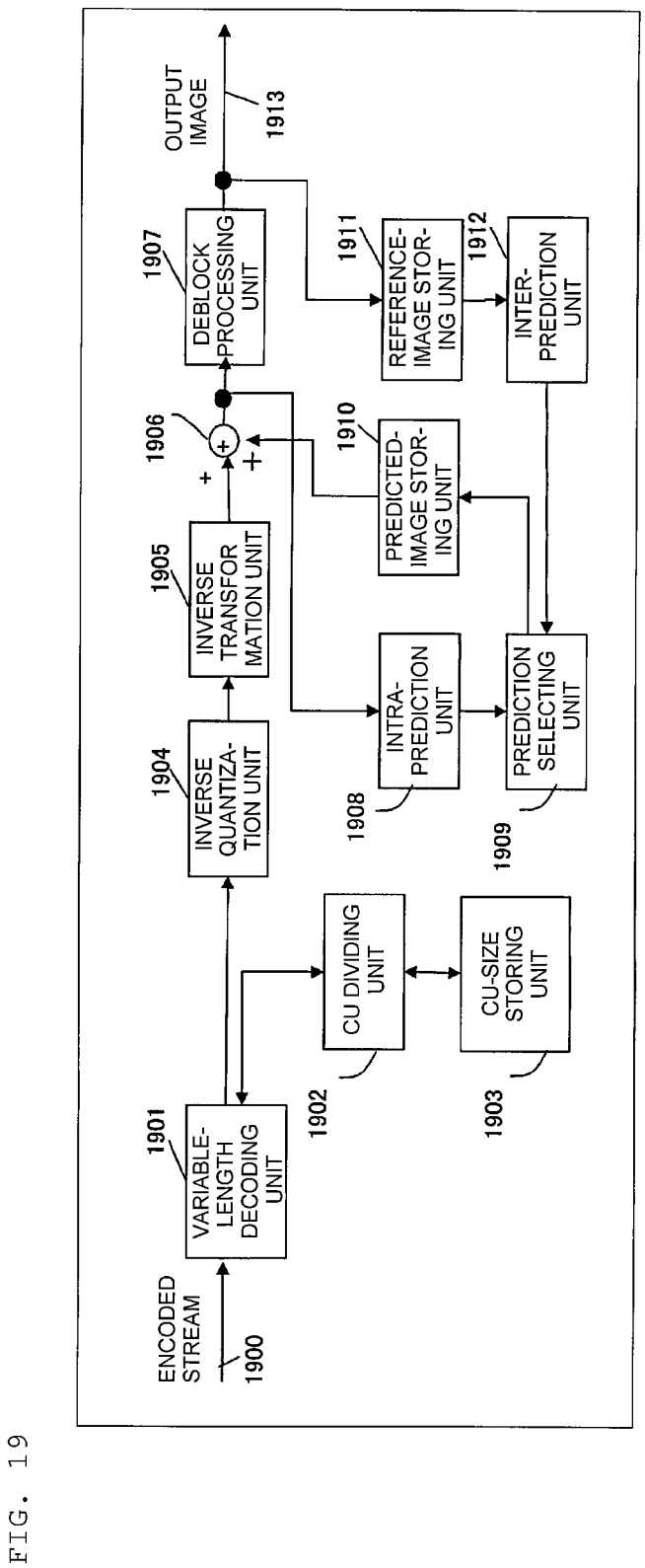
FIG. 19 is a diagram showing a schematic configuration of an image decoding device according to the first embodiment.

FIG. 19 is a diagram showing a schematic configuration of an image decoding device according to the first embodiment. In FIG. 19, the image decoding device includes a variable-length decoding unit 1901 configured to receive an input of an encoded stream 1900 and decode the encoded stream 1900, a block dividing unit 1902 configured to predict a CU size of an encoding target CU on the basis of size information of an encoded CU stored in a CU-size storing unit 1903 and determine the CU size, an inverse quantization unit 1904 configured to inversely quantize a transformed and quantized predicted error image in the CU, an inverse transformation unit 1905 configured to inversely transform a transformed predicted image obtained by inversely quantizing the predicted error image with the inverse quantization unit 1904 and output the predicted error image, an adder 1906 configured to add up a predicted image stored in a predicted-image storing unit 1910 and the predicted error image output from the inverse transformation unit 1905, and a deblock processing unit 1907 configured to apply deblock processing to an image of an addition result. The image decoding device outputs an output image 1913.

The moving image decoding device according to the first embodiment includes two prediction processing systems in order to generate the predicted image. A first system is a system by intra-prediction. The first system includes an intra-prediction unit 1908 configured to perform intra-prediction using image signals (before the deblock processing) of decoded CUs sequentially stored in a CU unit. A second system is a system by inter-prediction. The second system includes a reference-image storing unit 1911 configured to store an output image and an inter-prediction unit 1912 configured to perform motion compensation using a reference image stored in the reference-image storing unit 1911 and a motion vector decoded by the variable-length decoding unit 1901 and obtain an inter-predicted image. A prediction selecting unit 1909 selects, according to prediction mode information decoded by the variable-length decoding unit 1901, the predicted image generated by one of the two systems and stores the predicted image in the predicted image storing unit 1909.

<Processing Content (on Decoding Side) of the CU Dividing Unit>

Processing content of the CU dividing unit 1902 on image decoding side is explained below with reference to the drawings.

Figure 20:
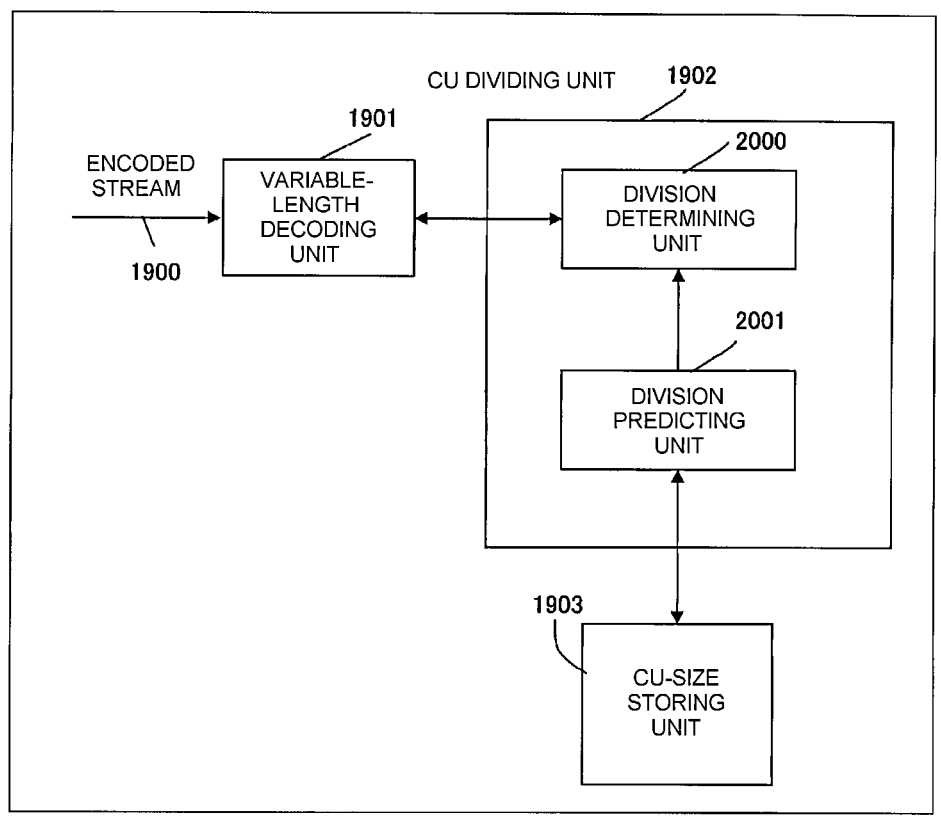
FIG. 20 is a diagram showing a schematic configuration of a CU dividing unit (in the decoding device).

FIG. 20 is a diagram showing an internal configuration of the CU dividing unit 1902. A division determining unit 2000 determines a division pattern in an encoding target LCU on the basis of CU division information decoded by the variable-length decoding unit 1901. Specific examples of the CU division information include the information of use_pred_split_flag and split_flag in FIG. 7. If use_pred_split_flag is 0, the CU dividing unit 1902 divides, according to the information of split_flag, an encoded target CU when split_flag is 1. The CU dividing unit 1902 does not divide the encoding target CU when split_flag is 0.

If use_pred_split_flag is 1, the division predicting unit 2001 predicts a division pattern of the encoding target CU. Processing content in the division predicting unit 2001 is the same as the processing content in the division predicting unit 801 in the encoding device. Therefore, explanation of the processing content is omitted. The CU-size storing unit 1903 has a function same as the function of the CU-size storing unit 116 in the encoding device.

The variable-length decoding unit 1901 performs variable length decoding processing for the encoding target CU on the basis of a division presence or absence pattern determined by the division determining unit 2000.

Consequently, the CU dividing unit 1902 in the image decoding device according to this embodiment predicts, according to flag information of the encoded stream, a division pattern of the encoding target LCU referring to information concerning peripheral CUs and CUs on a reference picture. Consequently, since the division pattern information of the encoding target LCU in the encoded stream can be reduced, it is possible to realize improvement of the compression ratio.

Second Embodiment

An image encoding device according to a second embodiment of the present invention is the same as the image encoding device according to the first embodiment except that, when a division pattern of an encoding target LCU is predicted, information indicating whether intra-division prediction is performed or inter-division prediction is performed is included in an encoded stream.

In an encoded stream shown in FIG. 21, compared with the encoded stream in the first embodiment, 1-bit information of use_intra_split_pred_flag is added. When use_intra_split_pred_flag is 1, this means that the intra-division prediction is performed. When use_intra_split_pred_flag is 0, this means that the inter-division prediction is performed.

In the image decoding device according to the second embodiment, the division predicting unit 2001 in the CU dividing unit 1902 in the first embodiment only has to switch the intra-division prediction and the inter-division prediction processing according to the flag of use_intra_split_pred_flag. Therefore, compared with the first embodiment, it is possible to realize the same information amount reduction while simplifying the division predicting method determination processing shown in FIG. 14.

The image encoding device according to the second embodiment only has to perform the division predicting method determination processing (FIG. 14) same as that in the first embodiment and store a determination result in use_intra_split_pred_flag in the encoded stream.

<Conclusion>

As explained above, the image encoding device predicts a CU size of an encoding target CU on the basis of size information of encoded CUs adjacent to the encoding target CU and size information of preceding and following encoded CUs. When the size of the encoding target CU coincides with the predicted size, the image encoding device does not sends the size information of the CUs and the image decoding device restores the CU size by performing the same prediction processing. Consequently, it is possible to reduce an information amount.

The functions of the first embodiment and the second embodiment can be realized as well by a program code of software for realizing the functions. In this case, a storage medium having recorded therein the program code is provided to a system or an apparatus. A computer (or a CPU or an MPU) of the system or the apparatus reads out the program code stored in the storage medium and cooperates with a control unit of the system and the apparatus to thereby realize the functions. As the storage medium for supplying the program code, for example, a flexible disk, a CD-ROM, a DVD-ROM, a hard disk, an optical disk, a magneto-optical disk, a CD-R, a magnetic tape, a nonvolatile memory card, a ROM, and the like are used.

An OS (operating system) or the like running on the computer may perform a part or all of actual processing on the basis of an instruction of the program code and the functions may be realized by the processing. Further, after the program code read out from the storage medium is written in a memory on the computer, the CPU or the like of the computer may perform a part or all of the actual processing on the basis of an instruction of the program code and the functions of the embodiments may be realized by the processing.

The program code of the software for realizing the functions may be stored in storing means such as the hard disk or the memory of the system or the apparatus or a storage medium such as a CD-RW or a CD-R by being distributed via a network. When using the program code, the computer (or the CPU or the MPU) of the system or the apparatus may read out the program code stored in the storing means or the storage medium and execute the program code.

REFERENCE SIGNS LIST

100 CU dividing unit
116 CU-size storing unit
105 intra-prediction unit
106 inter-prediction unit
102 transforming unit
103 quantizing unit
104 variable-length encoding unit
800 division determining unit
801 division predicting unit
1901 variable-length decoding unit
1902 CU dividing unit
1903 CU-size storing unit
1904 inverse quantization unit
1905 inverse transformation unit
1908 intra-prediction unit
1909 inter-prediction unit
2000 division determining unit
2001 division predicting unit

The invention claimed is:

1. An image decoding device that subjects an input encoded stream to variable-length decoding, inversely quantizes and inversely transforms the encoded stream into a predicted difference image in a decoding target coding unit, adds up the predicted difference image with a predicted image, and outputs an image, the image decoding device comprising:
a CU dividing unit configured to determine a division size of the decoding target coding unit; and
a CU-size storing unit configured to store the division size of the decoding target coding unit, wherein
the CU dividing unit predicts the division size of the decoding target coding unit, without using coding unit size information extracted from an encoded bit stream, by using size information of peripheral encoded coding units in the same picture and size information of encoded coding units in preceding and following pictures stored in the CU-size storing unit.

2. The image decoding device according to claim 1, wherein, when the decoding target coding unit is an I picture, the CU dividing unit performs intra-division prediction processing for predicting the division size using size information of a decoded coding unit adjacent to the decoding target coding unit in a picture in which the decoding target coding unit is present.

3. The image decoding device according to claim 2, wherein the decoded coding unit adjacent to the decoding target coding unit includes coding units adjacent to the decoding target coding unit above, on left of, and obliquely above the coding unit.

4. The image decoding device according to claim 3, wherein, when there are a plurality of the adjacent encoded coding units, the image decoding device determines the size information of the decoding target coding unit according to a majority rule from size information in the respective coding units.

5. The image decoding device according to claim 4, wherein, when a largest divided coding unit is absent on left of, above, and upper left of the decoding target coding unit, the image decoding device determines the size information without using intra-division prediction with respect to the decoding target coding unit.

6. The image decoding device according to claim 4, wherein, when a largest divided coding unit is present on left of the decoding target coding unit but a largest divided coding unit is absent above and on upper left of the decoding target coding unit, the image decoding device determines the size information of the decoding target coding unit using size information of the largest divided coding unit present on the left of the decoding target coding unit with respect to the decoding target coding unit.

7. The image decoding device according to claim 4, wherein, when a largest divided coding unit is present above the decoding target coding unit but a largest divided coding unit is absent on left and upper left of the decoding target coding unit, the image decoding device determines the size information of the decoding target coding unit using size information of the largest divided coding unit present above the decoding target coding unit with respect to the decoding target coding unit.

8. The image decoding device according to claim 4, wherein, when a largest divided coding unit is present above the decoding target coding unit but a largest divided coding unit is absent on upper left and obliquely upper left of the decoding target coding unit, the image decoding device determines the size information of the decoding target coding unit using size information of the largest divided coding unit present above the decoding target coding unit with respect to the decoding target coding unit.

9. The image decoding device according to claim 4, wherein, when largest divided coding units are present on left and above of the decoding target coding unit but a largest divided coding unit is absent on upper left of the decoding target coding unit, the image decoding device determines the size information of the decoding target coding unit using size information of the largest divided coding unit present on the left of the decoding target coding unit with respect to the decoding target coding unit.

10. The image decoding device according to claim 9, wherein the image decoding device further uses size information of the largest divided coding unit present above the decoding target coding unit.

11. The image decoding device according to claim 1, wherein, when the decoding target coding unit is a P picture or a B picture, the CU dividing unit performs intra-division prediction processing for predicting the division size of the decoding target coding unit using the size information of the encoded coding units of the preceding and following pictures.

12. The image decoding device according to claim 11, wherein, when the decoding target coding unit is the P picture and inter-division prediction is selected, the image decoding device refers to only a forward direction.

13. The image decoding device according to claim 11, wherein, when the decoding target coding unit is the B picture and inter-division prediction is selected, the image decoding device determines a reference direction according to a majority rule referring to a forward direction and a backward direction and sets, as the size information of the decoding target coding unit, size information of the coding unit including pixels referred to in a motion vector selected out of a plurality of motion vectors.

14. The image decoding device according to claim 11, wherein, when a reference position by the predicted motion vector indicates an outside of the picture, the image decoding device refers to pixels in vicinity of the reference position.

15. The image decoding device according to claim 14, wherein, if an X coordinate of the reference position is smaller than 0 or equal to or larger than a maximum value (PicWidth-1), the decoding device replaces the X coordinate of the reference position with 0 or PicWidth-1.

16. The image decoding device according to claim 14, wherein, if a Y coordinate of the reference position is smaller than 0 or equal to or larger than a maximum value (PicHeight-1), the decoding device replaces the Y coordinate of the reference position with 0 or PicHeight-1.

17. The image decoding device according to claim 1, wherein the CU dividing unit determines, on the basis of flag information indicating which of intra-division prediction and inter-division prediction is selected, the division size of the decoding target coding unit using the intra-division prediction or the inter-division prediction.

* * * * *